United States Patent
McCormick

Patent Number: 5,437,264
Date of Patent: Aug. 1, 1995

[54] WASTE HEAT COLLECTOR FOR DOMESTIC GAS WATER HEATERS

[76] Inventor: Billy J. McCormick, 43475 Cowboy Country Trail, Aguanga, Calif. 92536

[21] Appl. No.: 35,052
[22] Filed: Sep. 7, 1993
[51] Int. Cl.6 .............................................. F24H 1/00
[52] U.S. Cl. .................................. 126/364; 126/350 K; 126/344; 165/901
[58] Field of Search .................... 126/364, 350 R, 344, 126/31; 165/901

[56] References Cited

U.S. PATENT DOCUMENTS

| | | | |
|---|---|---|---|
| 1,311,702 | 7/1919 | Mathis | 126/364 |
| 4,275,687 | 6/1981 | Sasaki | 126/364 X |
| 4,484,564 | 11/1984 | Erickson | 126/364 X |
| 4,664,180 | 5/1987 | Stevenson | 165/901 X |

FOREIGN PATENT DOCUMENTS 693854  4/1930  France ................................ 126/364

Primary Examiner—Larry Jones

[57] ABSTRACT

A heat collection apparatus which collects the lost or waste heat from a domestic gas water heater. This apparatus sits on top of the water heater over the flue, where the lost heat is directed through the collector fins on the coil into the hot water outlet of the tank where the heated water flows into the tank.

1 Claim, 2 Drawing Sheets

FIG. 2
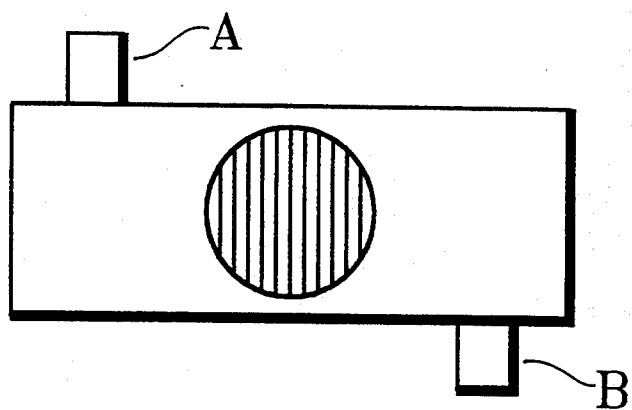
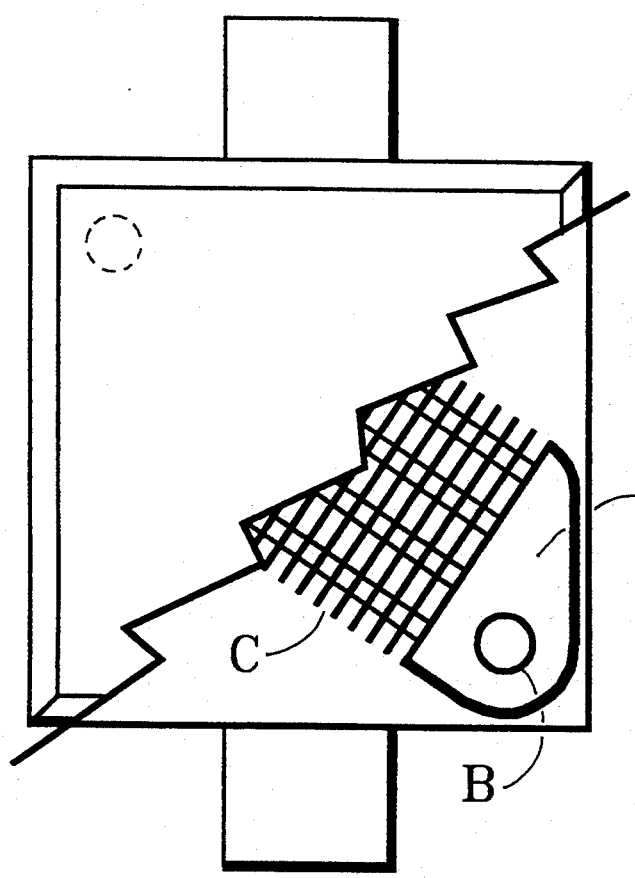
FIG. 3
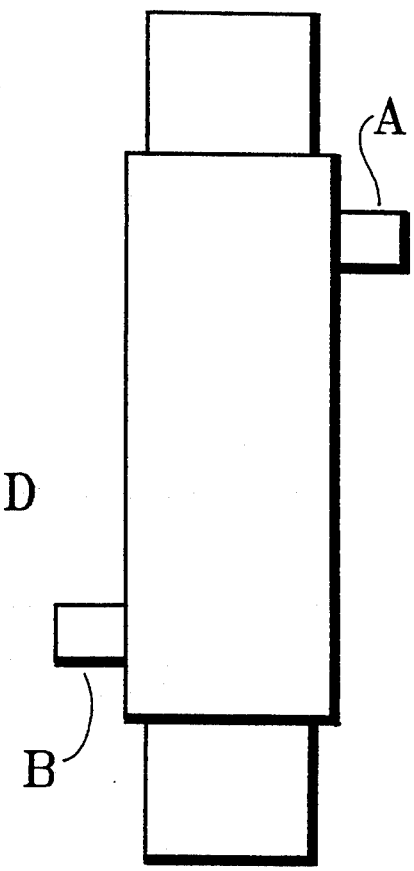
FIG. 1

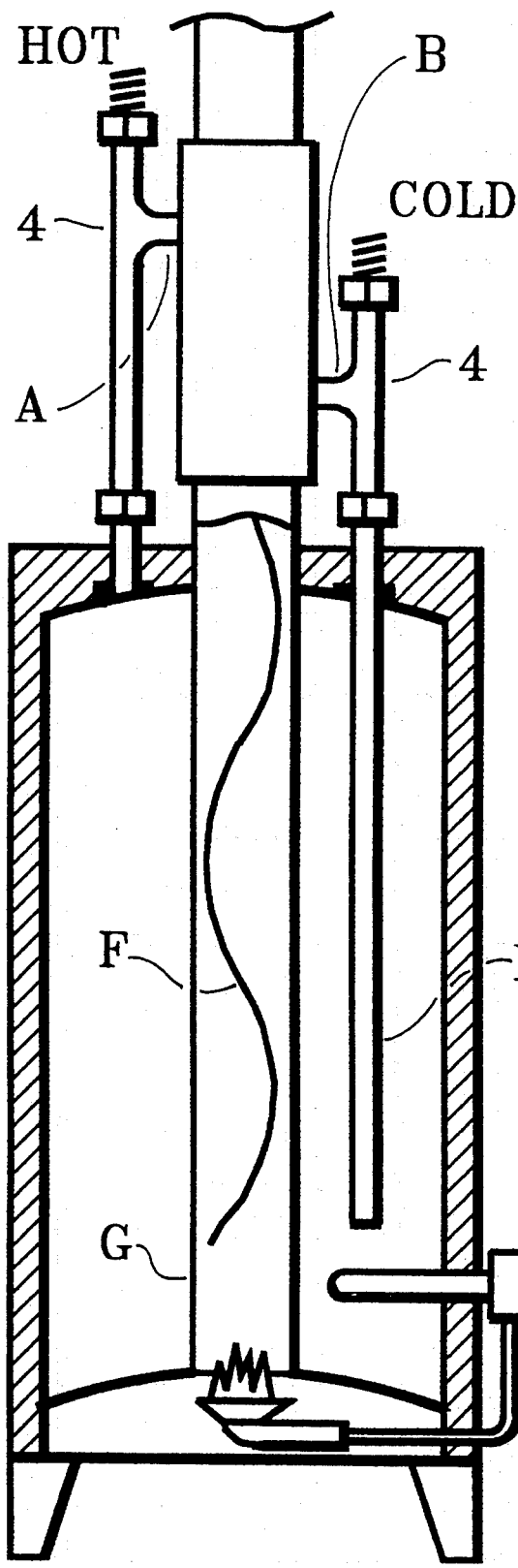
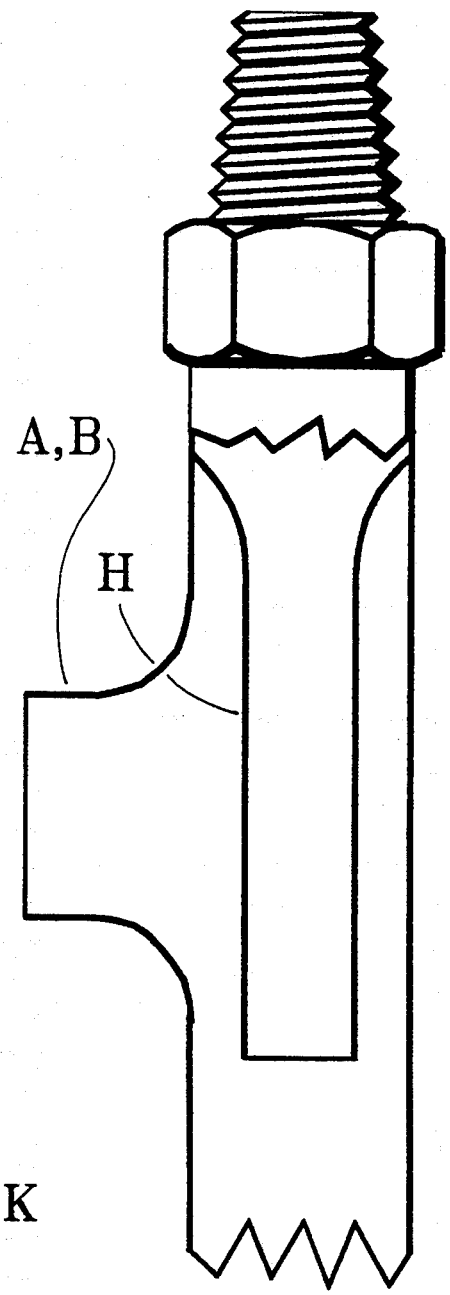
FIG. 4
FIG. 5

WASTE HEAT COLLECTOR FOR DOMESTIC GAS WATER HEATERS

BACKGROUND OF THE INVENTION

1. Field of the Invention

This invention is an apparatus that collects the lost or wasted heat from a domestic gas water heater, there by increasing the efficiency of the heater, by recovering the wasted heat.

2. Description of the Art

Various approaches to the problem of economically heating water for domestic and commercial use have employed a water heater in which an efficient heat source, typically a gas burner, is utilized to heat the contents of a water storage tank which is provided with an in-line connection to a domestic or commercial water systems generate a considerable of amount of waste heat which dissipates into the surrounding atmosphere, rather than heating the water in the storage tank. This waste heat, lost either directly, as a flow of heated gases vented through the exhaust flue of the water heater, there by significantly increasing the cost of heating water. Typically, a baffle is suspended within the exhaust flue to slow the flow of heated gases in a attempt to recover some of the waste heat. Also, while improved insulation and burner designs have reduced the amount of waste heat lost from the water heater storage tank, such approaches have not been successful at utilizing or recapturing the previously unused heat vented through the exhaust flue.

SUMMARY OF THE INVENTION

It is the object of the present invention to provide a water heating apparatus which may be employed to recapture waste heat vented through the exhaust flue of a convential water heater and to transfer this heat to the contents of the water storage tank.

Additionally, it is a further object of the present invention to provide a water heating apparatus that may be either retrofitted as an adjunct to an existing water heating system or provided as an accessory of a new, more efficient water heater.

Additionally, it is an object of the present invention to provide a water heating apparatus that is inexpensive to manufacture and easy to install.

The convection current cycles the water contained in the storage tank through the heat exchange unit where it is further heated without the need for external water pressure to drive the flow of water through the apparatus because the heat exchange unit is positioned in the exhaust flue.

An additional advantage of this arrangement is that it allows the apparatus to be installed without modifying the conventional water heater and eliminates the need for special valves, backflow preventors, or other additional plumbing hardware.

A BRIEF DESCRIPTION OF DRAWINGS

FIGS. 1-2-3 and 5 are frontal, side and top view of apparatus.

FIG. 4 is cutaway view of flow control. The flow control directs the flow of water when hot water is being drawn from storage tank.

FIG. 6 shows that cold water coming to storage tank will not flow through heat collector and mix with hot water. The injector tube jets the incoming cold water down the inlet tube so that the cold water goes to the bottom of storage tank and does not mix with hot water.

FIGS. 3 and 5 show cutaway showing construction of collector tubes I and collector fins C. Letter J shows connector pipe to flue. Letters A and B are connector pipes to the end tanks on collector tubes. Letter K is the thermostat which controls the water temperature in storage tank by controlling the burner. The thermostat controls the heat collector by controlling the burner. When the flame is on and heating water in storage tank, the lost or wasted heat is being collected by the heat collector. The water is circulated up the drip tube E to heat collector by convection and back into storage tank. This makes my device safe by being precisely controlled by the thermostat and cannot overheat. This device takes the flue gases at 500 degrees and takes out approximately 300 degrees cooling the flue gases to 200 degrees, making the water heater a much safer appliance.

I claim:

1. A heat collecting device to capture the lost or wasted heat from a domestic water heater storage tank and circulate the heat back into the storage tank, comprising a standard water heater, means for collecting waste heat including a means for jetting cold water into the bottom of the storage tank, a radiator coil surrounded by aluminum collector fins with copper tanks on each end of the tubes, an inlet pipe and outlet pipe with connections to the storage tank and an inlet for cold water and an outlet for the hot water, said collecting means including a sheet metal box surrounding the fins and coil for directing the flow of exhaust gases from the water heater over the fins.

* * * * *